United States Patent [19]

Siddall

[11] 4,239,531

[45] Dec. 16, 1980

[54] SPONGE RING FEED FOR IODIDE CRYSTAL BAR CELLS

[75] Inventor: Mark B. Siddall, Albany, Oreg.

[73] Assignee: Teledyne Industries, Inc., Los Angeles, Calif.

[21] Appl. No.: 19,328

[22] Filed: Mar. 12, 1979

[51] Int. Cl.³ .................... C22B 34/14; C01G 25/04; C01G 27/04

[52] U.S. Cl. .................... 75/84.4; 75/101 R; 423/72; 423/76; 423/78

[58] Field of Search .................... 75/84.4, 84.5, 84.1, 75/102, 101 R, 121, 84; 423/69, 72, 73, 76, 77, 78, 240, 241, 492; 210/510

[56] References Cited

U.S. PATENT DOCUMENTS

| 2,885,281 | 5/1959 | Newnham | 75/84.4 |
| 2,895,852 | 7/1959 | Loonam | 75/84.4 |
| 2,955,566 | 10/1960 | Campbell et al. | 75/84.4 |
| 3,053,649 | 9/1962 | Galmiche | 75/84 |
| 3,116,144 | 12/1963 | Loonam et al. | 75/84.4 |
| 3,146,092 | 8/1964 | Morse et al. | 75/84 |

FOREIGN PATENT DOCUMENTS 559497  7/1958  Canada .................... 75/84.4

OTHER PUBLICATIONS

Rolsten, "Iodide Metals and Metal Iodides", John Wiley & Sons, Inc., N.Y., 1961, pp. 64-65.

*Primary Examiner*—L. Dewayne Rutledge
*Assistant Examiner*—Peter K. Skiff
*Attorney, Agent, or Firm*—Shoemaker and Mattare, Ltd.

[57] ABSTRACT

Using a self-supporting metal sponge ring compact in an Iodide Crystal Bar Cell, as opposed to a loose fill. The sponge ring is formed by compressing the metal into a self supporting sponge ring by any means including isostatic pressing or conventional ram pressing.

3 Claims, 4 Drawing Figures

SPONGE RING FEED FOR IODIDE CRYSTAL BAR CELLS

BACKGROUND OF THE INVENTION

1. Field of the Invention

This invention relates to a new method and compact for loading an Iodide Crystal Bar Cell with a metal for purification. More specifically, it deals with the formation and use of a metal compact of the material to be purified for placement in the cell.

2. Description of the Prior Art

Within an Iodide Crystal Bar Cell, metal is purified by reacting feed metal with iodine to produce a metal iodide which is thermally decomposed back to the metal on a hot wire filament thus freeing the iodine. The metal is separated from the impurity in the first reaction, and subsequently, is separated from the iodine by the decomposition reaction.

In the past, the metal was loaded into the cell in loose form so as to facilitate the reaction. To prevent the metal from coming into contact with the filament and grounding the same, a screen is placed around the filament. This screen is made of molybdenum or other material, which will not react with the iodine. There have been problems with the screen because the screen is expensive to replace and also slows down the reaction in that it acts as a physical barrier to the gaseous diffusion of iodine and metal iodide. It is, therefore, obvious that a method is desired which will not hinder the reaction, while at the same time not increase the costs substantially.

BRIEF SUMMARY OF THE INVENTION

Objects of the Invention

It is, accordingly, one object of the present invention to provide a new method for loading metal feed in an Iodide Crystal Bar Cell for purification thereof.

An additional object of the present invention is to provide a new metal compact for use in an Iodide Crystal Bar Cell.

Another object of the present invention is to provide a new method for loading an Iodide Crystal Bar Cell wherein the metal to be purified is formed into self-sustaining sponge compacts, doughnut in shape, for placement inside the Iodide Crystal Bar Cell, each of said compacts supporting itself and the compacts above it in the cell.

A more specific object of the present invention is to form a sponge metal compact from zirconium or hafnium, which is doughnut in shape, having an outer circumference less than that of an Iodide Cell and a round hole in the center having a circumference which allows room for the heating filament of the cell.

A further object is to apply this metal compact to all metals which can be processed in a crystal bar cell.

These and other advantages will become apparent from the following detailed description and drawings.

In accordance with the above objects, it has been found that the purification of a metal in an Iodide Crystal Bar Cell can be increased more than two times, while at the same time decreasing the cost of production due to negating the necessity of using a center screening mechanism in the cell. This is accomplished by compacting the metal to be purified into ring shaped sponge compacts which are self-supporting and capable of supporting all of the ring compacts above them in the cell. The compacts are produced by pressing the metal in a ring shaped mold either isostatically or mechanically.

DETAILED DESCRIPTION OF THE INVENTION

Figure 1:
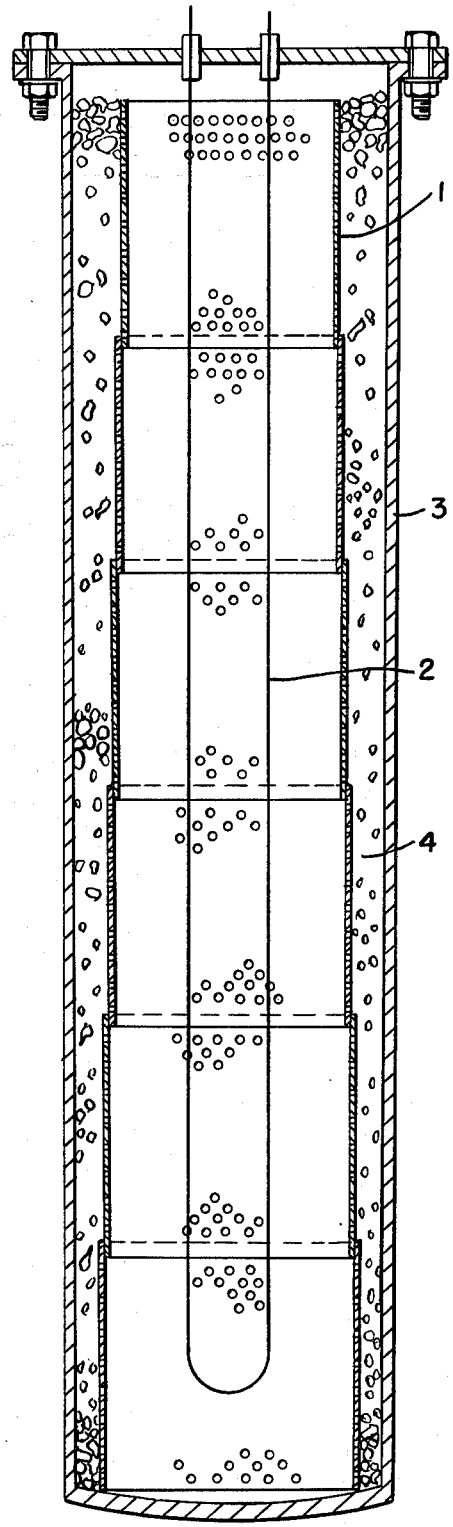
FIG. 1 is a sectional view of an Iodide Crystal Bar Cell of the prior art.

In accordance with the present invention, there has been found a method of loading an Iodide Crystal Bar Cell with a metal whereby there is no necessity for a screening mechanism, thus increasing the freedom of movement of the reactants and increasing production. This is accomplished by forming the metal into sponge compacts which are self-supporting and capable of supporting those compacts placed above them. A more clear description of the invention can be seen wherein FIG. 1 is a cross-sectional view of an Iodide Crystal Bar Cell of the prior art. The moylbdenum screen 1 can be seen surrounding the electric heating filament 2 in an Iodide Crystal Bar Cell. The metal 4 to be purified is placed between the outer cell wall 3 and the molybdenum screen 1.

Figure 2:
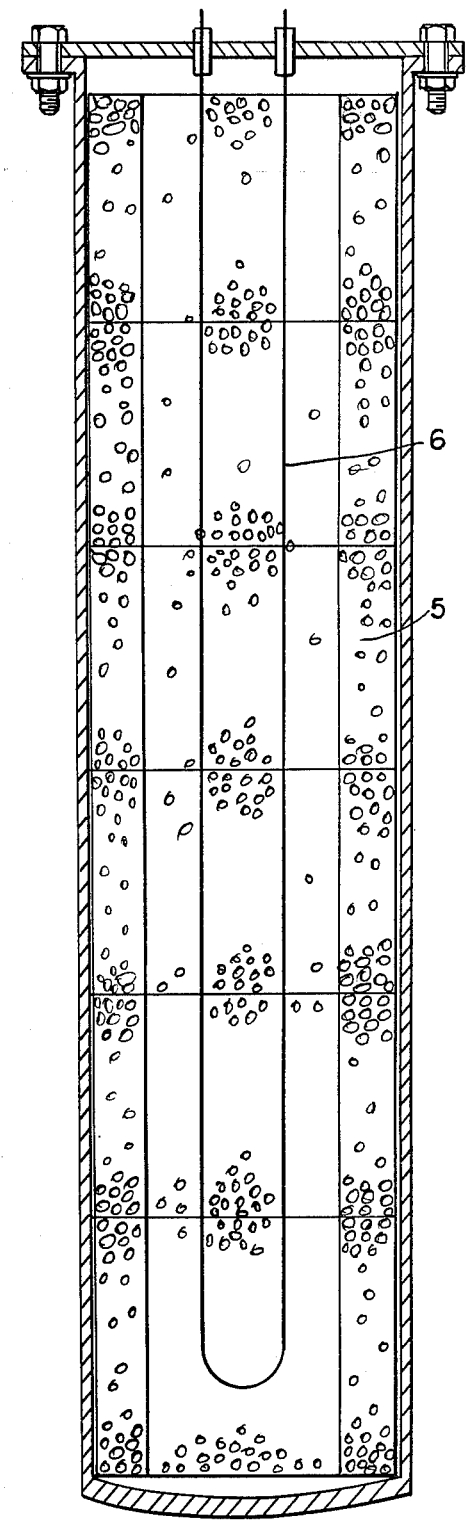
FIG. 2 is a sectional view of an Iodide Crystal Bar Cell of this invention.

Referring to FIG. 2, there is shown a sectional view of the Iodide Crystal Bar Cell of the present invention wherein the sponge metal compacts 5 are placed in the cell one above the other forming a wall around the filament 6.

Figure 3:
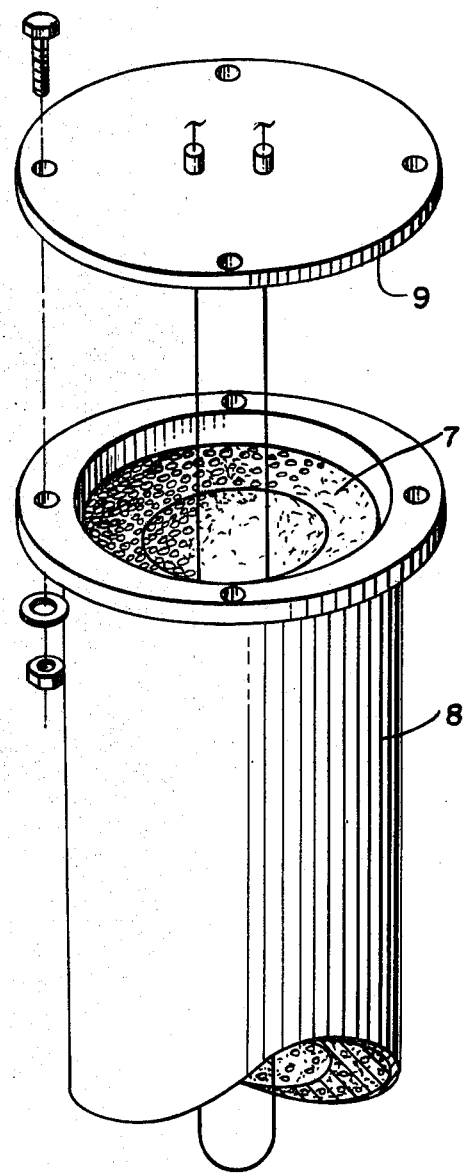
FIG. 3 is a fractional perspective view of an Iodide Crystal Bar Cell of this invention.

Another perspective view of the cell is shown in FIG. 3 wherein the compact 7 can be seen inside the cell wall 8 below lid 9.

Figure 4:
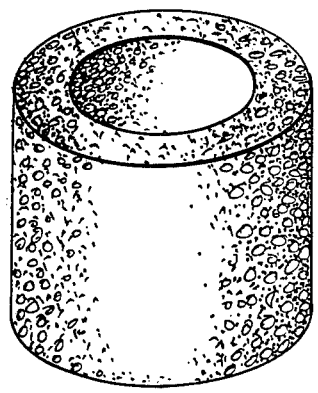
FIG. 4 is a view of a self-supporting metal sponge ring compact.
Figure 4:
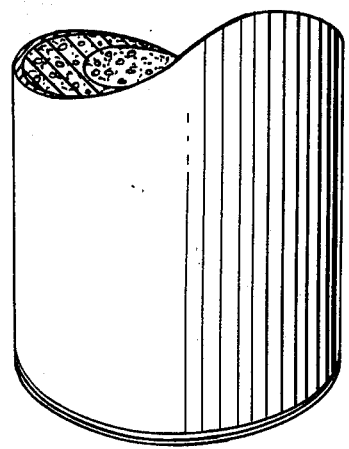

In FIG. 4 there is shown the sponge metal compact, per se.

It can be seen from the figures that just as the screening mechanism was placed in the cell sectionally, the compacts are placed in the cell one above the other. The use of the compact facilitates loading and unloading of the cell, while at the same time increasing the production and lowering the costs.

A series of tests were made using hafnium ring shaped compacts. These tests were compared with a loose filled hafnium metal. The results of the tests are shown in Table 1, wherein, cells 3, 5 and 6 show the results of using ring shaped compacts and the other cells and all loose fill cells using a molybdenum screen. It can readily be seen from the results shown in the column entitled "Growth Rate" that the ring compact increased production more than two times that of loose fill.

TABLE 1

| CELL NO. | NO. OF RUNS | GROSS WEIGHT (LB.) | GROWTH RATE (lbs/hr) | REMARKS |
|---|---|---|---|---|
| 1 | 6 | 265 | .78 | |
| 2 | 6 | 285 | .83 | |
| 3 | 2 | 304 | 1.40 | Rings |
| 4 | 1 | 115 | .95 | |
| 5 | 1 | 139 | 1.45 | Rings |
| 6 | 1 | 178 | 1.45 | Rings |
| 7 | 7 | 289 | .80 | |
| 8 | 1 | 149 | .86 | |
| 9 | | | | |
| 10 | 2 | 0 | 0 | |
| 11 | 6 | 327 | .78 | |

TABLE 1-continued

| CELL NO. | NO. OF RUNS | GROSS WEIGHT (LB.) | GROWTH RATE (lbs/hr) | REMARKS |
|---|---|---|---|---|
| 12 | 7 | 265 | .92 | |

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the mete and bounds of the claims or that form their functional as well as conjointly cooperative equivalent are, therefore, intended to be embraced by those claims.

What is claimed is:

1. A method of purifying metal in an iodide crystal bar cell wherein the metal is fed into the cell and reacted therein with iodine under heat and pressure to produce pure metal, the improvement comprising loading zirconium or hafnium sponge compact in the cell in the form of self-supporting ring shaped compacts placed one on top of each other thus allowing the loading of the cell without the necessity of a supporting screen.

2. The process of claim 1 wherein the compacts are formed by isostatic pressure.

3. The process of claim 1 wherein the compacts are formed by conventional ram pressing.

* * * * *